E. LA VINE.
HYGIENIC SUGAR BOWL.
APPLICATION FILED JULY 19, 1913.

1,105,803.

Patented Aug. 4, 1914.
2 SHEETS—SHEET 1.

Witnesses

Inventor:
Edward La Vine
by B. Singer Atty

E. LA VINE.
HYGIENIC SUGAR BOWL.
APPLICATION FILED JULY 19, 1913.
1,105,803.
Patented Aug. 4, 1914.
2 SHEETS—SHEET 2.
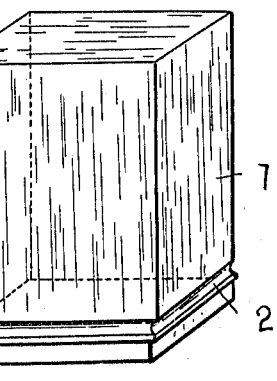
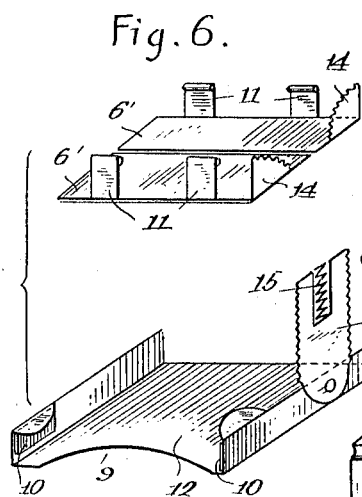
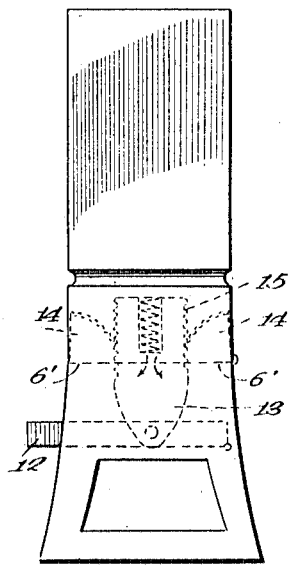
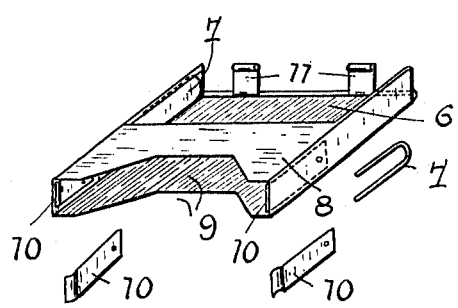
THE NORRIS PETERS CO., PHOTO-LITHO., WASHINGTON, D. C.

UNITED STATES PATENT OFFICE.

EDWARD LA VINE, OF BRUSSELS, BELGIUM.

HYGIENIC SUGAR-BOWL.

1,105,803.  Specification of Letters Patent.  Patented Aug. 4, 1914.

Application filed July 19, 1913. Serial No. 779,976.

*To all whom it may concern:*

Be it known that I, EDWARD LA VINE, citizen of the United States of America, residing at Brussels, Belgium, have invented a new and useful Hygienic Sugar-Bowl; and I do hereby declare the following to be a full, clear, and exact description of the same.

The present invention has for its object a hygienic sugar-bowl for use in coffee-houses, restaurants, hotels, private houses and the like, and comprises essentially a casing for the sugar pieces, the bottom of said casing being constituted by a clapet device pivotally arranged and provided with an outlet or mouth, wherein a piece of sugar glides automatically as soon as the clapet device is being pushed down, for the purpose of preserving the sugar from being brought into contact with dust, flies and the like.

Figure 1:
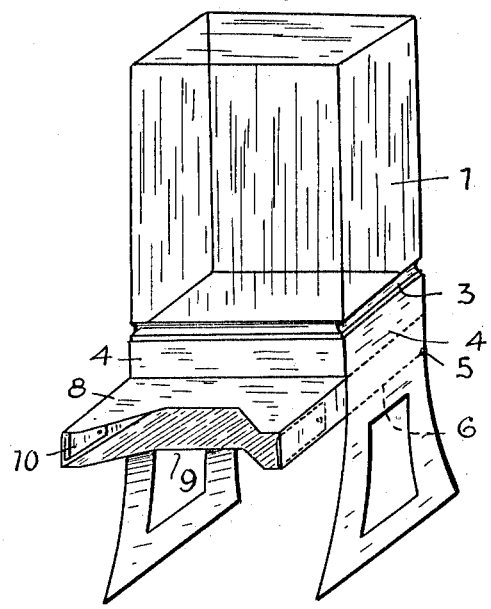
Figure 2:
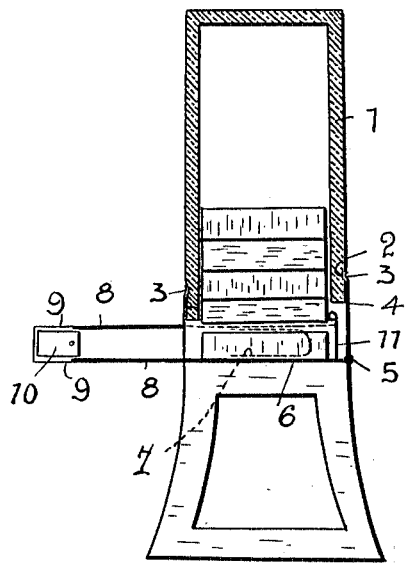
Figure 3:
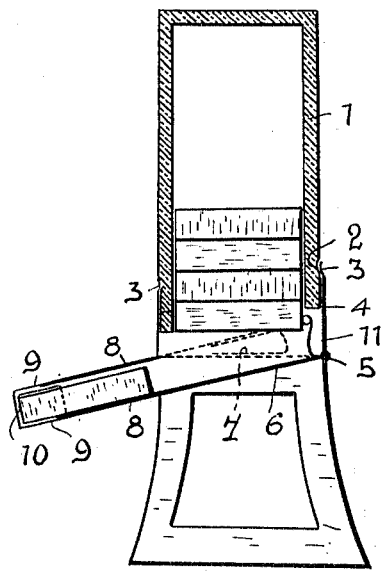

In the accompanying drawings, I have shown one form of construction of the object of the invention, and in these drawings:
Figure 1 is the perspective view of the sugar-bowl. Fig. 2 is a vertical cross-section of same, when not in use. Fig. 3 shows the same section with a piece of sugar just delivered, and Fig. 4 illustrates detail views of all parts constituting the sugar-bowl. Fig. 5, is a side view of a modified form of my device, and Fig. 6, shows detail views of the clapet-device and of the control device for the same.

The latter comprises a casing 1 made of glass or any other material and having at its bottom part a groove 2. The casing 1, the bottom of which is open for the filling in of the sugar pieces, is fitted by pressure in the resilient flange 3 of a collar piece 4, to which is pivotally connected in 5 the clapet device 6 constantly held against the collar piece by means of springs 7 (see Figs. 2, 3 and 4). The clapet device 6 is terminated, in front of the sugar-bowl, by an outlet or mouth 8 having its middle part 9 hollowed out and being on its lateral walls provided with two spring blades 10 rendering thus the mouth narrower for the purpose of stopping the piece of sugar getting out of the recipient or casing 1. To the clapet device 6 are fixed one or more stops 11 constituted for instance by flexible metal blades.

The working of the device is as follows: To get one of the sugar pieces contained in the casing 1, it will be sufficient to push down the clapet device 6 so as to enable one piece of sugar to pass between the said clapet 6 and the collar 4. The piece of sugar gliding forward arrives in the mouth 8, at the end of which it will be stopped by means of the spring blades 10. The hollowed out middle part 9 will allow the piece of sugar to be taken off with the fingers, by overcoming the pressing action exerted by the spring blades 10. The clapet device 6 being released, it will automatically and by action of the springs 7 get back into the first position. During the pushing down of the clapet device 6, in order to get the lowermost piece of sugar to slide into the mouth 8, the stops 11 (Fig. 3) bear against the next piece of sugar and prevent it from falling upon the clapet device 6 until the latter becomes raised in its locking position. In this second form of construction, instead of the piece of sugar sliding on the pivoted clapet 6, the device is provided with two pivoting clapets 6' which, when opened, drop the piece of sugar into a receiver 12 hinged to the legs of the sugar-bowl. The receiver 12 is connected with a double toothed bar 13 in engagement with two toothed segments 14 fixed to the clapets 6'. According to this arrangement and when pushing down the receiver 12, the toothed bar 13 pulls with it the segments 14, the latter operating the opening of the clapets 6' and drop one piece of sugar, while the following piece of sugar is retained by the stops 11 fixed to the clapet 6'. The clapets 6' are brought automatically back to their locking position by means of a spring 15 arranged in a slide of the toothed bar 13 and fixed, on the one hand, to the said toothed bar, and on the other hand, to a fixed part of the sugar-bowl.

Two or four of the beforedescribed devices can be coupled together so as to constitute sugar-bowls with two or four faces respectively.

The opening and closing of the clapets 6' can be made by any other means, without departing from the scope of the invention.

Having fully described my invention, what I claim and desire to secure by Letters Patent is:

1. A hygienic sugar-bowl, comprising a casing for the sugar pieces, the bottom of which casing being constituted by a clapet device pivotally arranged and being constantly under the action of springs, the said clapet device being terminated, in front of the casing, by an outlet or mouth, wherein the piece of sugar glides when the clapet device is pushed down, for the purpose of preserving the sugar from any exterior contact.

2. A hygienic sugar-bowl comprising in combination, a casing, a collar piece supporting said casing and connected thereto, a clapet-device pivotally secured to said collar, a plurality of stops upon said clapet device for arresting the next to the lowermost piece of sugar, while said lowermost piece slides into the mouth of said clapet-device, and flexible blades for arresting said lowermost piece and for allowing the removal of the same through an opening of said clapet-device.

In testimony whereof, I have signed my name to this specification in the presence of two subscribing witnesses.

EDWARD LA VINE.

Witnesses:
MANUEL WOODSON,
A. OUTRELE.

---

Copies of this patent may be obtained for five cents each, by addressing the "Commissioner of Patents. Washington, D. C."